US012568568B2

(12) United States Patent
Yu et al.

(10) Patent No.: US 12,568,568 B2
(45) Date of Patent: Mar. 3, 2026

(54) THREE-WIRE LED ADDRESSABLE ONLINE, THREE-WIRE CONTINUOUS LED LIGHT STRING SET, AND ONLINE ADDRESSING METHOD THEREOF

(71) Applicant: Taizhou Lifa Electronics Co., Ltd., Zhejiang (CN)

(72) Inventors: Deyong Yu, Zhejiang (CN); Haiyang Chen, Zhejiang (CN); Jiaying Yu, Zhejiang (CN); Xiaoping He, Zhejiang (CN)

(73) Assignee: Taizhou Lifa Electronics Co., Ltd., Zhejiang (CN)

( * ) Notice: Subject to any disclaimer, the term of this patent is extended or adjusted under 35 U.S.C. 154(b) by 93 days.

(21) Appl. No.: 18/408,572

(22) Filed: Jan. 10, 2024

(65) Prior Publication Data

US 2025/0203739 A1 Jun. 19, 2025

(30) Foreign Application Priority Data

Dec. 15, 2023 (CN) ......................... 202323439152.5
Dec. 22, 2023 (CN) ......................... 202311786925.9

(51) Int. Cl.
*H05B 47/18* (2020.01)
*F21S 4/26* (2016.01)
(Continued)

(52) U.S. Cl.
CPC ................ *H05B 47/18* (2020.01); *F21S 4/26* (2016.01); *F21V 23/002* (2013.01); *F21V 23/06* (2013.01);
(Continued)

(58) Field of Classification Search
CPC ......... H05B 47/18; H05B 47/345; F21S 4/26; F21V 23/002; F21V 23/06; F21Y 2113/17
See application file for complete search history.

(56) References Cited

U.S. PATENT DOCUMENTS 10,697,598 B1 * 6/2020 Chen ......................... F21S 4/10
2013/0313988 A1 * 11/2013 McRae .................. H05B 45/00 315/193

(Continued)

FOREIGN PATENT DOCUMENTS

CN 213305811 U * 5/2021
CN 115405878 A * 11/2022 ................ F21S 4/10

(Continued)

*Primary Examiner* — Seokjin Kim
(74) *Attorney, Agent, or Firm* — JCIPRNET

(57) ABSTRACT

The present invention provides a three-wire LED addressable online, a three-wire continuous LED light string set, and an online addressing method thereof. The three-wire continuous LED light string set includes a plurality of LED light strings. The LED light string includes a plurality of LED light bodies connected via a three-wire conductor, a first power connection terminal at a head end, and a second power connection terminal at a tail end. The LED light string further includes a control terminal, and the control terminal is connected to a power supply terminal. When the plurality of LED light strings are connected conductively and arbitrarily to form a whole combined LED light string, the control terminal is connected to the combined LED light string via the power supply terminal, and the control terminal is capable of coding and burning again for the combined LED light string.

15 Claims, 10 Drawing Sheets

(51) Int. Cl.

| | |
|---|---|
| ***F21V 23/00*** | (2015.01) |
| ***F21V 23/06*** | (2006.01) |
| ***H05B 45/345*** | (2020.01) |
| *F21Y 113/17* | (2016.01) |

(52) U.S. Cl.

CPC ........ *H05B 45/345* (2020.01); *F21Y 2113/17* (2016.08)

(56) References Cited

U.S. PATENT DOCUMENTS

| | | | | |
|---|---|---|---|---|
| 2014/0334134 | A1* | 11/2014 | Loomis | A41G 1/005<br>362/123 |
| 2016/0183338 | A1* | 6/2016 | Loomis | H05B 45/48<br>315/185 R |
| 2018/0271314 | A1* | 9/2018 | McRae | F21V 23/008 |
| 2018/0295695 | A1* | 10/2018 | Loomis | F21S 4/10 |
| 2019/0335563 | A1* | 10/2019 | Yu | H05B 45/397 |
| 2022/0121606 | A1* | 4/2022 | Heldeis | G06F 13/4022 |

FOREIGN PATENT DOCUMENTS

| | | | | |
|---|---|---|---|---|
| CN | 219181759 | | | 6/2023 |
| TW | 1701971 | B | * | 8/2020 |
| TW | 202042592 | A | * | 11/2020 |

* cited by examiner

THREE-WIRE LED ADDRESSABLE ONLINE, THREE-WIRE CONTINUOUS LED LIGHT STRING SET, AND ONLINE ADDRESSING METHOD THEREOF

CROSS-REFERENCE TO RELATED APPLICATION

This application claims the priority of China application serial no. 202323439152.5, filed on Dec. 15, 2023, and China application serial no. 202311786925.9, filed on Dec. 22, 2023, The entirety of each of the above-mentioned patent applications is hereby incorporated by reference herein and made a part of this specification.

BACKGROUND

Technical Field

The present invention relates to the technical field of LED technologies, and in particular to a three-wire LED addressable online, a three-wire continuous LED light string set, and an online addressing method thereof.

Description of Related Art

The DMX512 protocol is a digital multiplexing protocol developed by the United States Institute for Theatre Technology. It is a dimming protocol used between transmitters and dimming devices, serving as a universal signal control protocol for digital lighting devices. In an LED chip system based on the DMX512 protocol, one DMX512 controller can control multiple LED chips. The signal is transmitted between the DMX512 controller and the LED chip using DMX485, that is, a RS485 bus. A DMX512 data packet includes a start code and 512 data frames, meaning that each packet includes 513 bytes, and each individual data frame includes 1 start bit, 8 data bits, and 2 stop bits. The transmission rate of signal data of DMX512 is 250 Kbps and a bit width of the data frame is 4 μs. It takes 44 μs to send one frame and about 23 ms to transmit a data packet of 513 bytes.

In the prior art, the control chip of an LED unit stores a fixed address, receives only frame data corresponding to its address, and performs the display function based on the received frame data. Therefore, the LED chip system based on the DMX512 protocol can digitally control the LED chips effectively. However, after production of the existing three-wire LED light string, its addressing wire has already automatically completed fixed addressing. As a result, the corresponding fixed address in the finished LED unit cannot be changed, resulting in excessively large limitation on the LED units during use. The existing LED unit is typically controlled to turn on only based on the DMX512 controller and fails to work under other communication protocols. To avoid this defect, the current approach is the production of the five-wire LED light string, which includes a VCC main wire, a GND main wire, an addressing wire A, an addressing wire B, and a DATA wire, resulting in high use costs of the wire materials. Worse, the upstream row materials of these wires are increasing in price and relate to many fields such as metal, rare metal, and chemical. The LED unit, and especially, the LED light string, require a large amount of wire materials of whose costs are continuously increasing due to the factor, namely, the price increase in row materials of copper, plastic, and the like, thus affecting the manufacturing costs of these enterprises.

In addition, for example, the patent No. CN219181759U has disclosed a circuit board connection structure of a four-wire magic color LED light string, including multiple circuit boards, a power-supply positive terminal VDD, a power-supply negative terminal GND, a signal input terminal DI, a signal output terminal DO, an LED light body, and a series circuit. The circuit boards are all used for welding the LED lights. A first pad, a second pad, a third pad, and a fourth pad are all disposed on a back surface of the circuit board. The first pad is disposed on an upper side of the circuit board, the second pad is disposed on a lower side of the circuit board, the third pad is disposed on a left side of the circuit board, and the fourth pad is disposed on the right side of the circuit board. The series circuit sequentially connects the circuit boards in series. The power-supply positive terminal VDD is connected to the first pad, the power-supply negative terminal GND is connected to the second pad, the signal input terminal DI is connected to the third pad, and the signal output terminal DO is connected to the fourth pad. However, the four wires need to be in parallel, resulting the overall high manufacturing costs and a resource waste to some extent.

The light of the existing LED light string is usually controlled by three means: 1. A product based on parallel protocol is used, but it usually cannot achieve online addressing and pre-burning is required. As a result, after the LED light strings are connected in parallel, their functions cannot be updated for use. 2. A product based on series protocol is used, but it can achieve only signal transmission, indicating a single function, and cannot be connected in parallel for use. 3. A relevant online non-addressable product with a power-line carrier type is used. For this, the damage of one light ball in the existing LED light string affects the control over the entire LED light string, resulting in later inconvenient repair and maintenance. In addition, after production of the existing LED light strings, the addresses are usually pre-burnt, which does not allow for arbitrary connection, thus causing a large use limitation.

SUMMARY

In terms of the foregoing problem, the present invention is intended to provide a three-wire LED addressable online, a three-wire continuous LED light string set, and an online addressing method, allowing for any combination of the LED strings and achieving the function of repeating addressing online, thus improving the user convenience.

The present invention can use the following technical solution to resolve the technical solution:

A three-wire LED addressable online is provided, including a three-wire conductor and a plurality of LED light bodies conductively connected via the three-wire conductor. The three-wire conductor includes a positive electrode conductor, a negative electrode conductor, and signal wires. The signal wire in any one of the LED light bodies is disconnected, and connection breakpoints of two signal wires in the LED light body are respectively a signal input terminal and a signal output terminal. A control chip and an LED light-emitting chip are disposed in the LED light body, and the signal input terminal and the signal output terminal are both connected to the control chip.

The signal output terminal of any one of the LED light bodies is connected to the signal input terminal of a next LED light body correspondingly adjacent to the LED light body. The control chip achieves instruction reception and transmission via the signal input terminal and the signal output terminal of the signal wire and completes addressing for a corresponding LED light body.

The LED light body is provided with a first conductive bracket connected to the positive electrode conductor, a second conductive bracket connected to the negative electrode conductor, and a third conductive bracket set connected to the signal wire. The third conductive bracket set includes two third conductive brackets, the two third conductive brackets are apart from each other, the signal wire in an interval between the two third conductive brackets is disconnected, and two breakpoints of the signal wire are conductively connected to the two third conductive brackets, respectively.

The LED light body includes a light body bracket. The first conductive bracket, the second conductive bracket, and the third conductive bracket set are all disposed on a bottom surface of the light body bracket, and a positive electrode bracket, a negative electrode bracket, and a signal bracket set are disposed on an upper surface of the light body bracket. The signal bracket set includes two signal brackets, the positive electrode bracket is connected to the first conductive bracket, the negative electrode bracket is connected to the second conductive bracket, and the signal bracket and the third conductive bracket that are located on a same side are connected correspondingly.

The control chip is disposed on the positive electrode bracket or the negative electrode bracket, and a signal conductor is disposed on the signal bracket to be conductively connected to the control chip. The LED light body further includes a protection chip, and the protection chip and the control chip are both disposed on the positive electrode bracket or the negative electrode bracket.

An encapsulating gel is also included, where the encapsulating gel encapsulates an outer surface of the LED light body.

A three-wire continuous LED light string set is provided, including a plurality of LED light strings. The LED light string includes a plurality of LED light bodies connected via a three-wire conductor, the LED light body being the foregoing three-wire LED addressable online. The LED light string further includes a first power connection terminal at a head end and a second power connection terminal at a tail end. Any two of the LED light strings are connectable conductively via the first power connection terminal and the second power connection terminal. The LED light string further includes a control terminal, where the control terminal is connected to at least one power supply terminal, and the power supply terminal is conductively connected to the first power connection terminal or the second power connection terminal. When the plurality of LED light strings are connected conductively and arbitrarily to form a whole combined LED light string, the control terminal is connected to the combined LED light string via the power supply terminal, and the control terminal is capable of coding and burning again for the combined LED light string.

The first power connection terminal and the second power connection terminal are respectively a male plug and a female plug, and when one of the first power connection terminal and the second power connection terminal is the male plug, the other one is the female plug; and the power supply terminal is any one of a male plug or a female plug.

When the first power connection terminal is any one of the male plug or the female plug, the power supply terminal is the other one, and the second power connection terminal is able to be an enclosed end.

The control terminal includes a control module and a boost module. The control terminal is configured to achieve signal transmission and complete coding and burning output, the control module is configured to achieve signal input for a control chip in each of the LED light bodies in the combined LED light string and complete addressing for each of the LED light bodies, and the boost module is configured to supply power to the control module during coding and burning.

The control terminal is mounted in a USB controller or a voltage controller, the control terminal is connected to the power supply terminal via the three-wire conductors, and the USB controller or the voltage controller is provided with a power interface.

The control terminal is mounted in a battery box, the battery box is provided with a battery slot, and the battery slot is used for accommodating a detachable power source.

The battery box is provided with a solar assembly.

An online addressing method for a three-wire LED addressable online is provided and applied to the foregoing three-wire LED addressable online. The method specifically includes the following steps: S1: selecting a light string with a corresponding quantity of LED light bodies based on a use requirement, and connecting the light string to a control terminal; S2: connecting the control terminal to a power supply, and turning on the power supply to electrify the entire LED light string; S3: inputting, by the control terminal, an instruction signal via a button and entering an address burning mode via the control module, so as to achieve signal input for a control chip in each of the LED light bodies in the LED light string and complete coding and burning; and S4: achieving, by the control terminal, light control of the LED light string.

An online addressing method for a three-wire continuous LED light string set is provided and applied to the foregoing three-wire continuous LED light string set. The addressing method for the light string includes the following steps: S1: selecting a corresponding quantity of LED light strings based on a use requirement, sequentially connecting the light strings via the first power connection terminal and the second power connection terminal, and connecting the light strings to the control terminal; S2: connecting the control terminal to a power supply, and turning on the power supply to electrify the entire combined LED light string; S3: inputting, by the control terminal, an instruction signal via a button and entering an address burning mode via the control module, so as to achieve signal input for a control chip in each of the LED light bodies in the combined LED light string and complete coding and burning; and S4: achieving, by the control terminal, light control of the combined LED light string.

Compared with the prior art, the present invention has the following beneficial effects: The present invention, with the use of the three-line four-point optimized structural design, can achieve functional switching of the LED light body between online coding and burning and signal transmission. During online coding, series arrangement is achieved, and during signal transmission, a switch is made to parallel protocol. The use of the control terminal and the segmented LED light string as well as the optimized LED light bodies in the LED light string allows for arbitrary connection of the combined LED light string, such that the users can arbitrarily combine any light strings based on their own requirements, making the later repair and maintenance convenient. In addition, without the need to pre-burn addresses, the present invention can achieve arbitrary online addressing or repeat burning and addressing.

To clearly know the features of the present invention, a reference may be made to the accompanying drawings and the following preferred implementations.

DESCRIPTION OF THE EMBODIMENTS

Figure 1:
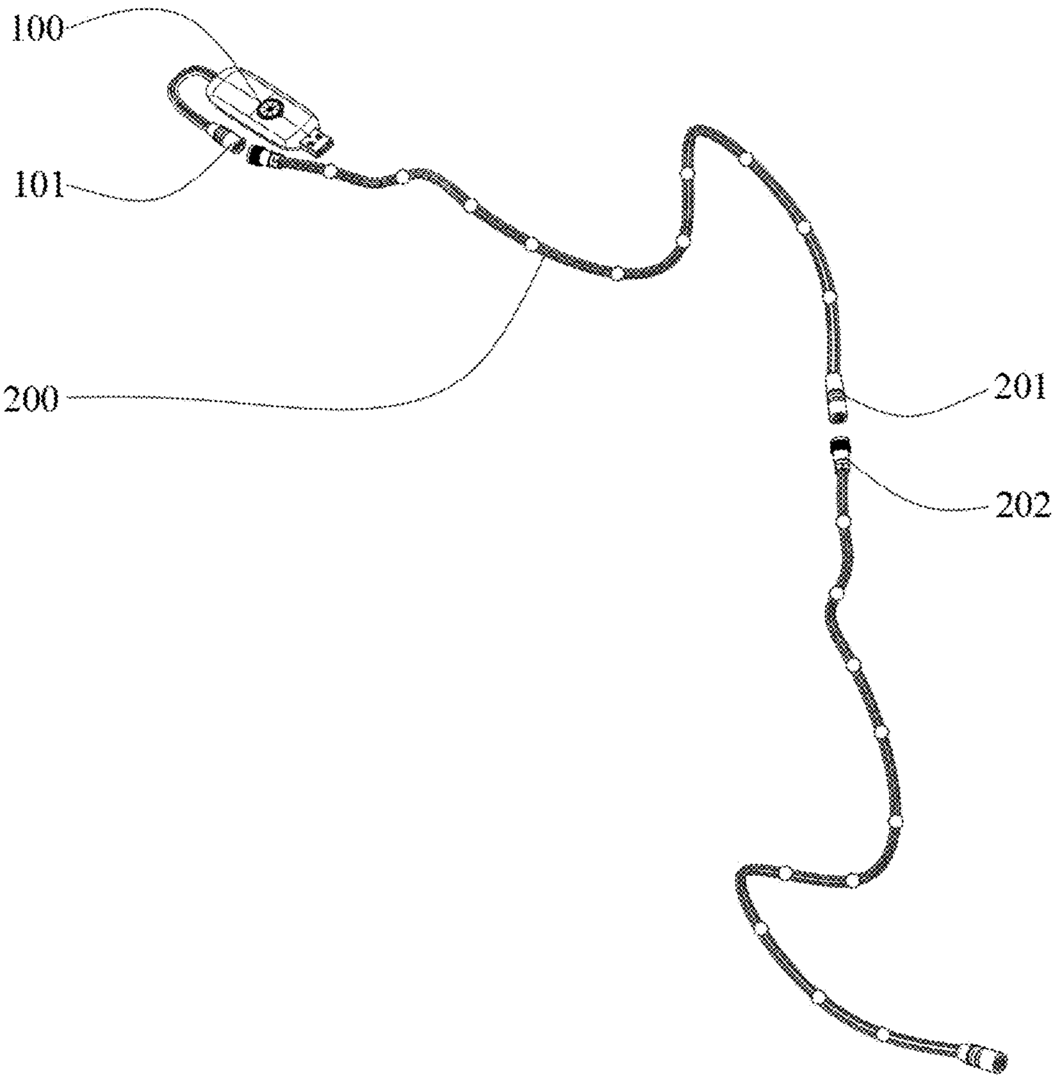
FIG. 1 is a schematic diagram of an overall structure of the present invention.
Figure 2:
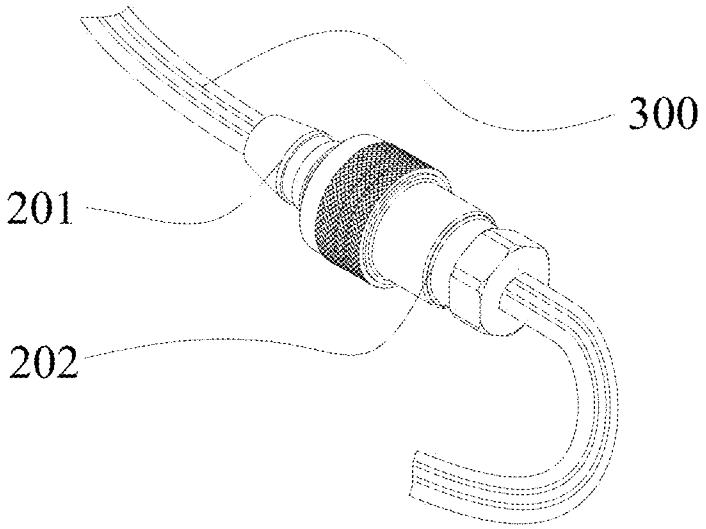
FIG. 2 is a schematic structural diagram of a first power connection terminal and a second power connection terminal being connected and mounted according to the present invention.
Figure 3:
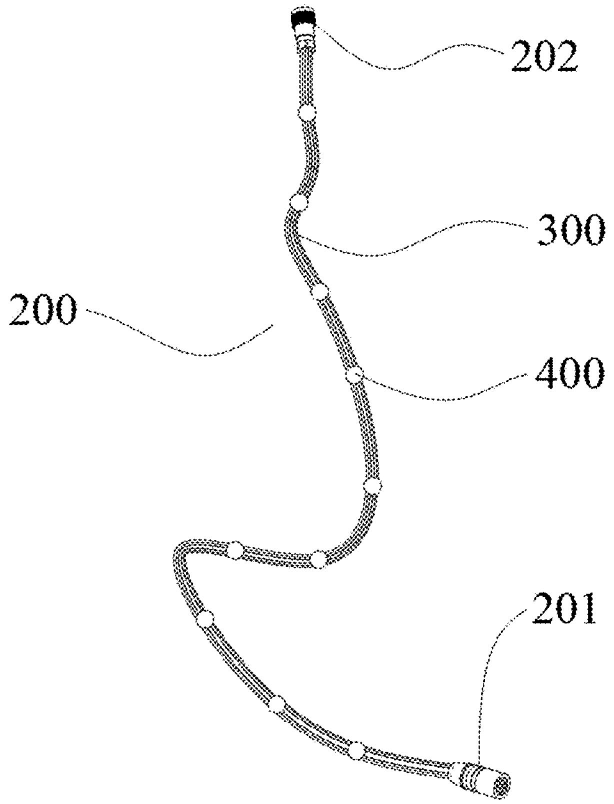
FIG. 3 is a first schematic structural diagram of an LED light string according to the present invention.
Figure 4:
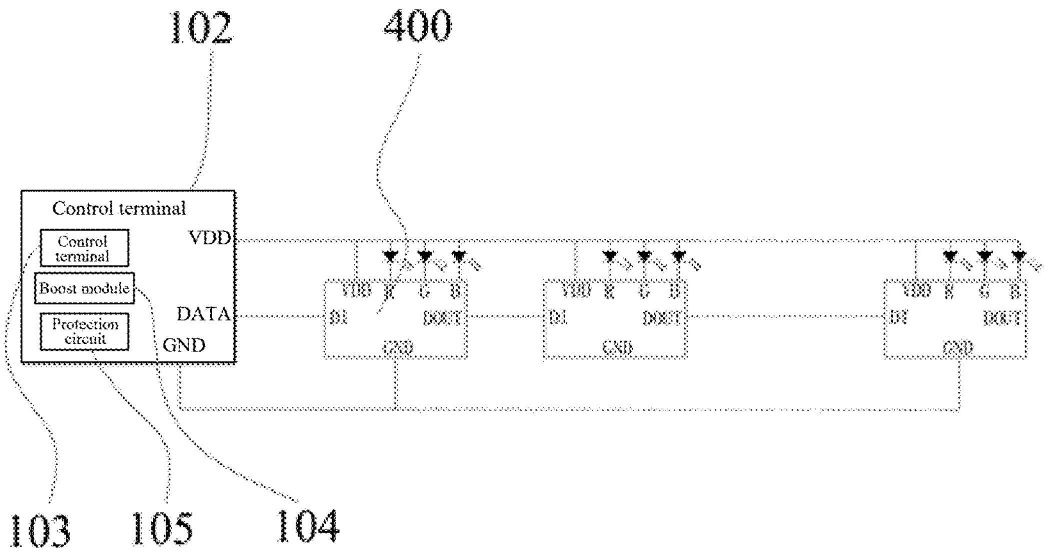
FIG. 4 is a schematic diagram of a control principle according to the present invention.

For ease of clear understanding for the technical means, creative features, objectives, and effects achieved by the present invention, the following further elaborates the present invention with reference to specific accompany drawings.

Embodiment 1

Referring to FIGS. 1 to 13, the present invention discloses a three-wire continuous LED light string set and an online addressing method thereof. The light string set includes a plurality of LED light strings 200. The LED light string 200 includes a plurality of LED light bodies 400 connected via a three-wire conductor 300, a first power connection terminal 201 at a head end, and a second power connection terminal 202 at a tail end. The LED light strings 200 may include the same quantity of the LED light bodies 400 or not. Typically, an individual LED light string 200 includes at least 20 LED light bodies 400. Any two of the LED light strings 200 are connectable conductively via the first power connection terminal 201 and the second power connection terminal 202. The first power connection terminal 201 and the second power connection terminal 202 are respectively a male plug and a female plug, and when one of the first power connection terminal 201 and the second power connection terminal 202 is the male plug, the other one is the female plug. The male and female plugs are typical of a commonly used structure in the prior art, for example, the three-wire plug structure, so as to fit with the three-wire conductor 300, and may be in different sizes and types.

The three-wire conductor 300 includes a positive electrode conductor 310, a negative electrode conductor 320, and signal wires 330. The signal wire 330 in any one of the LED light bodies 400 is disconnected, connection breakpoints of two signal wires 330 in the LED light body 400 are respectively a signal input terminal and a signal output terminal. A control chip 401 and an LED light-emitting chip 402 are disposed in the LED light body 400, and the signal input terminal and the signal output terminal are both connected to the control chip 401. The signal output terminal of any one of the LED light bodies 400 is connected to the signal input terminal of a next LED light body 400 correspondingly adjacent to the LED light body 400. The control chip 401 achieves instruction reception and transmission via the signal input terminal and the signal output terminal of the signal wire 330 and completes addressing for a corresponding LED light body.

In summary, a control terminal assembly 100 is further included, and the control terminal assembly 100 is provided with a control terminal 102. The control terminal 102 is connected to a power supply terminal 101. The power supply terminal 101 is conductively connected to the first power connection terminal 201 or the second power connection terminal 202, and is any one of a male plug or a female plug, facilitating conductive connection. When the plurality of LED light strings 200 are connected conductively and arbitrarily to form a whole combined LED light string, the control terminal 102 is connected to the combined LED light string via the power supply terminal 101, and the control terminal 102 is capable of coding and burning again for the combined LED light string. The control terminal 102 includes a control module 103 and a boost module 104. The control module 103 is configured to achieve signal transmission and complete coding and burning output. The control module 103 is configured to achieve signal input for a control chip 401 in each of the LED light bodies 400 in the combined LED light string and complete addressing for each of the LED light bodies 400. The boost module 104 is configured to supply suitable power to the control module 103 during coding and burning.

During specific use, the boost module 104 usually uses a boost circuit, and the control module 103 uses a control IC, that is, an integrated circuit, which is used for reception input, control input, or the like of data signal. A protection circuit 105 is also disposed on a circuit board in the control terminal 102, thus integrating the overall control function. A button is also provided for achieving signal input, for example, long press, short press, interval press, and other signal input methods. Alternatively, a touchscreen may be combined with a plurality of signal buttons to achieve signal input, such that the control terminal can achieve switch between different functions, such as, switch of light control and resetting switch of coding and burning.

During practical operation, after the LED light strings 200 are combined, also with the control terminal 102, the control terminal 102 inputs a signal via the button. After the power is on, the control terminal 102 sends a command to an input terminal in the control chip 401 in the LED light body 400. The boost module 104 with the control module transmits the corresponding data. With the use of the input terminal and the output terminal in the control chip 401 in the LED light body 400, after a series of complete data is output based on the signal of the control terminal 102, each LED light body 400 sequentially and automatically positions the address to read data. Usually, burning examination is performed on the input terminal in the control chip 401, and reading is stopped when no data is input. When the instruction indicates entering the burning mode, the burning time of each LED light body 400 is typically 80 μs. If there are 1000 light bodies in total, a wait of 80000 μs is required after the burning instruction is sent.

In the above structure, the control chip 401 in the LED light body 400 is a three-wire 256-level grayscale LED chip with a constant current driver based on parallel protocol. Such chip supports the 300-900 ns single-line return-zero-code protocol, but has a different code sending manner from the return-zero-code. A RGB three-channel PWM constant current driver is built in. An LED chip with another color combination is further included. This embodiment does not specifically limit the size of the LED chip, which may be in various sizes on the market. The chip integrates data regeneration and data shaping functions, and can achieve independent grayscale control, cascade control, and the like, through external MCU control, so as to realize 256-level grayscale control of light emitting in a colorful matrix.

According to an optimized design of the present invention, the use of the control terminal and the segmented LED light string as well as the optimized LED light bodies in the LED light string allows for arbitrary connection of the combined LED light string, such that the users can arbitrarily combine any light strings based on their own requirements, making the later repair and maintenance convenient. In addition, without the need to pre-burn addresses, the present invention can achieve arbitrary online addressing or repeat burning and burning.

Embodiment 2

Referring to the foregoing embodiment, in a preferred embodiment, an online addressing method for a three-wire LED addressable online is disclosed and applied to the three-wire LED addressable online. The method specifically includes the following steps: S1: selecting a light string with a corresponding quantity of LED light bodies based on a use requirement, and connecting the light string to a control terminal; S2: connecting the control terminal to a power supply, and turning on the power supply to electrify the entire LED light string; S3: inputting, by the control terminal, an instruction signal via a button and entering an address burning mode via the control module, so as to achieve signal input for a control chip in each of the LED light bodies in the LED light string and complete coding and burning; and S4: achieving, by the control terminal, light control of the LED light string.

This embodiment is suitable for a light string formed by three-wire LEDs addressable online, facilitating online addressing.

Referring to the foregoing embodiment, in a preferred embodiment, a three-wire continuous LED light string set and an online addressing method thereof are disclosed. The method includes the following steps: S1: selecting a corresponding quantity of LED light strings based on a use requirement, sequentially connecting the light strings via the first power connection terminal and the second power connection terminal, and connecting the light strings to the control terminal; S2: connecting the control terminal to a power supply, and turning on the power supply to electrify the entire combined LED light string; S3: inputting, by the control terminal, an instruction signal via a button and entering an address burning mode via the control module, so as to achieve signal input for a control chip in each of the LED light bodies in the combined LED light string and complete coding and burning; and S4: achieving, by the control terminal, light control of the combined LED light string.

During use, the normal operation mode is that after the power is on, the control terminal sends the corresponding instruction to the control chip in each LED light body in the combined LED light string, thus controlling light of each LED light body.

In this embodiment, the LED light strings can be arbitrarily connected without the need for special marking or sorting during production, transportation, or use, and they are connected in series just based on the quantity, shape, or the like required by the user. The control terminal can repeat online addressing, and such design can also facilitate later repair and maintenance.

Embodiment 3

Figure 5:
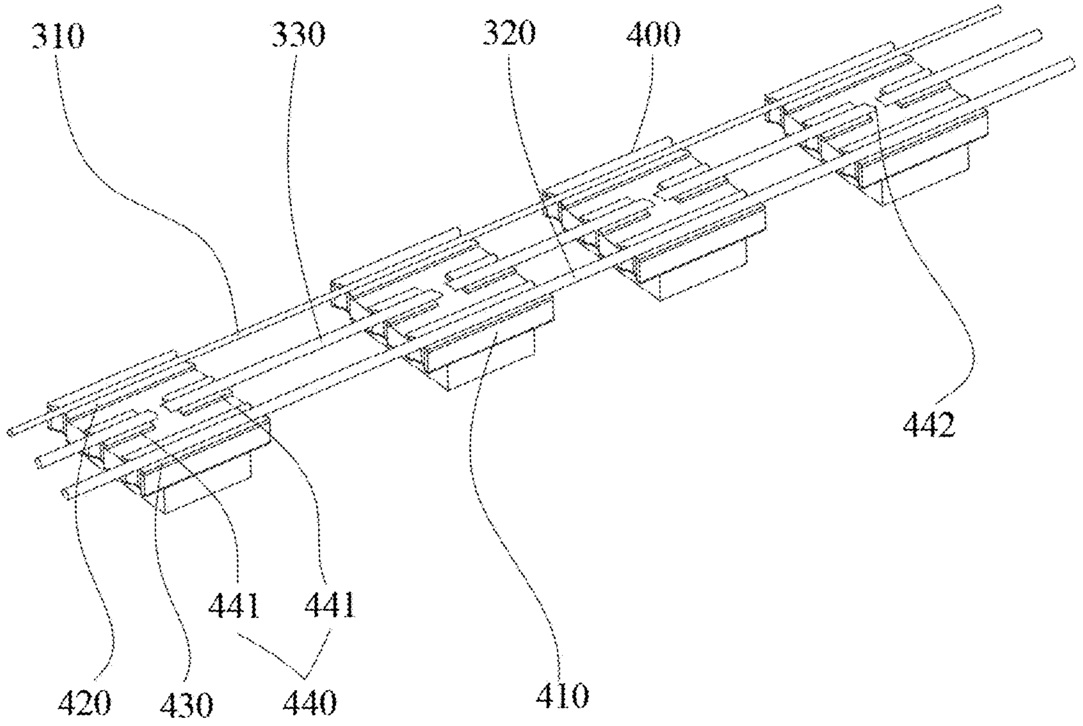
FIG. 5 is a first schematic structural diagram of an LED light body according to the present invention.
Figure 6:
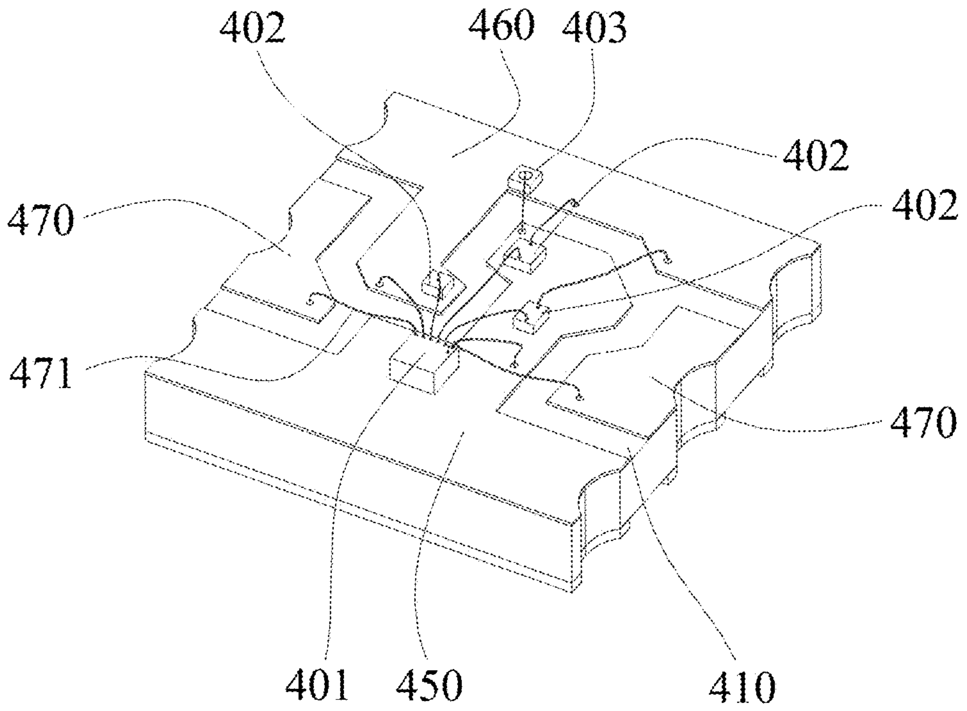
FIG. 6 is a second schematic structural diagram of the LED light body according to the present invention.
Figure 7:
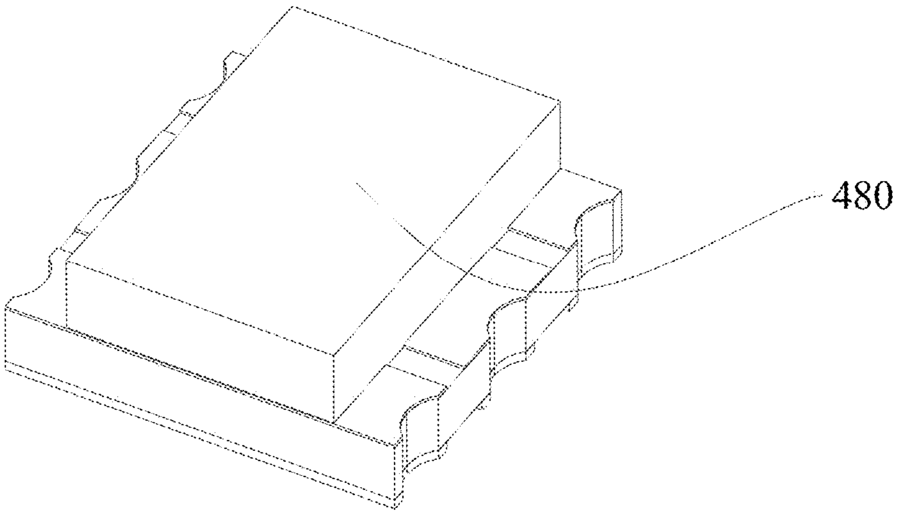
FIG. 7 is a schematic structural diagram of an LED light body and an encapsulating gel according to the present invention.

Referring to FIGS. 5 to 7, this embodiment discloses three-wire LED light bodies addressable online, including three conductors and a plurality of LED light bodies connected via the three conductors. The three conductors are equivalent to the three-wire conductor 300 in Embodiment 1, namely, the positive electrode conductor 310, the negative electrode conductor 320, and the signal wire 330. Typically, the three conductors are also the VCC main line, the GND main line, and the signal wire, which respectively achieve power connection and signal transmission.

Preferably, the signal wire 330 in any one of the LED light bodies 400 is disconnected, and connection breakpoints of two signal wires 330 in the LED light body 400 are respectively a signal input terminal and a signal output terminal. A control chip 401 and an LED light-emitting chip 402 are disposed in the LED light body 400, and the signal input terminal and the signal output terminal are both connected to the control chip 401 for signal transmission. The signal input terminal and signal output terminal are both controlled by the logic module in the control chip to switch the state of a loaded function, thus allowing for burning, arranging, and positioning of the address of the LED light body 400 or signal transmission based on parallel protocol.

Referring to the foregoing design, when the light string formed by the LED light bodies 400 needs to be addressed, the control terminal 102 sends related coding protocol and enables the logic module in the control chip 401 to recognize it, so as to switch functions, thus allowing for burning, arranging, and positioning of the address of the LED light body 400 or signal transmission based on parallel protocol. The specific control principle of the logic module is as follows: With the power on, after the signal input terminal in the middle receives a signal, the logic module in the control chip 401 performs, by default, internal signal retrieval, reading, shaping, amplification, and forwarding, and then the signal output terminal transmits the processed signal to the next unit. This is the normal operation state in a default situation. When the logic module in the control chip receives the relevant addressing command code, it starts to switch the operation state, from a signal transmission state to the functional state required for coding and burning and enables each pre-coding unit to be in a locatable state with the signal wires connected in series. Subsequently, following the sent guidance command, the logic module sends the address code to the positioning order unit. Finally, the logic module finishes the command of burning the sent address burning code and exits the address code burning state, and returns to the default state.

The foregoing structural design enables the signal wire 330 in any one of the LED light body 400 to be disconnected, and combining the LED light bodies 400 enables a single signal wire 330 to form two signal wires for use, resulting in the signal input terminal and the signal output terminal. This facilitates input of the instruction signal into the terminal and also signal reception by the control chip 401 in each LED light body 400. The three-wire four-point function is achieved, allowing for burning, arranging, and positioning of the address of the LED light body 400 or signal transmission based on parallel protocol.

The signal output terminal of any one of the LED light bodies 400 is connected to the signal input terminal of a next LED light body 400 correspondingly adjacent to the LED light body 400. The control chip achieves instruction reception and transmission via the signal input terminal and the signal output terminal of the signal wire 330 and completes addressing for a corresponding LED light body 400.

In a specific structure, the LED light body 400 is provided with a first conductive bracket 420 connected to the positive electrode conductor 310, a second conductive bracket 430 connected to the negative electrode conductor 320, and a third conductive bracket set 440 connected to the signal wire 330. The third conductive bracket set 440 includes two third conductive brackets 441, the two third conductive brackets 441 are apart from each other, the signal wire 330 in an interval between the two third conductive brackets 441 is disconnected, and two breakpoints of the signal wire 330 are conductively connected to the two third conductive brackets 441, respectively. The third conductive bracket set 440 is optimized to include the two third conductive brackets 441 apart from each other, facilitating the formation of breakpoints of the signal wire 330. During practical production, a cutting groove 442 is formed between the two third conductive brackets 441. After the signal wire 330 is laid with the two third conductive brackets 441, the signal wire 330 in the cut groove 442 is cut to break, so as to form two breakpoints.

In summary, the LED light body 400 includes a light body base plate 460. The first conductive bracket 420, the second conductive bracket 430, and the third conductive bracket set 440 are all disposed on a bottom surface of the light body base plate 460, and a positive electrode bracket 450, a negative electrode bracket 460, and a signal bracket set are disposed on an upper surface of the light body base plate 460. The signal bracket set includes two signal brackets 470, the positive electrode bracket 450 is connected to the first conductive bracket 420, the negative electrode bracket 460 is connected to the second conductive bracket 430, and the signal bracket 470 and the third conductive bracket 441 that are located on a same side are connected correspondingly. The control chip 401 is disposed on the positive electrode bracket 450 or the negative electrode bracket 460, and a signal conductor 471 is disposed on the signal bracket 470 to be conductively connected to the control chip 401. In a preferred embodiment, the control chip 401 is disposed on the positive electrode bracket 450 and connected to the two signal brackets 470 on two sides of the signal conductor 471. At least one LED light-emitting chip 402 is typically arranged on the positive electrode bracket 450, such as a blue-light LED chip, or a green-light LED chip. Arranging a red-light LED chip on the negative electrode bracket can contribute to multi-color emission. The control chip 401 is further connected to the positive electrode bracket 450, the LED light-emitting chip 402, and the negative electrode bracket 460 via the wires. The LED light-emitting chip 402 on the positive electrode bracket 450 usually also needs to be connected to the negative electrode bracket 460 via the wire.

In a preferred embodiment, a protection chip 403 is also included, and the protection chip 403 and the control chip 401 are both disposed on the positive electrode bracket 450 or the negative electrode bracket 460. Usually, the protection chip 403 is disposed on the negative electrode bracket 460, and the protection chip 403 is connected to the positive electrode bracket 450 via the wire.

In a preferred embodiment, an encapsulating gel 480 is also included, where the encapsulating gel 480 completely or half encapsulates an outer surface of the LED light body 400, to mainly encapsulate the light body base plate 460. The encapsulating gel 480 is typically transparent and facilitates water-proof dust-proof protection.

Figure 16:
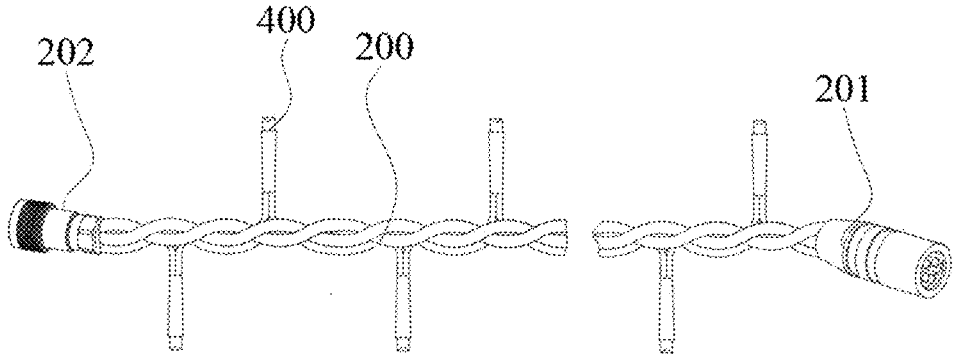
FIG. 16 is a second schematic structural diagram of an LED light string according to the present invention.

In a preferred embodiment, referring to FIG. 16, the LED light body 400 inside the LED light string 200 may be of a lamp-press structure. The LED light body may be in the shape of round head, ellipse, concave, bullet, straw hat, lozenge, or polygon known commonly in the prior art.

The present invention, with the use of the three-line four-point optimized structural design, can achieve functional switching of the LED light body between online coding and burning and signal transmission. During online coding, series arrangement is achieved, and during signal transmission, a switch is made to parallel protocol.

The three-wire LED light body addressable online disclosed in this embodiment is the LED light body 400 in the LED light string 200 in Embodiment 1.

Embodiment 4

Figure 8:
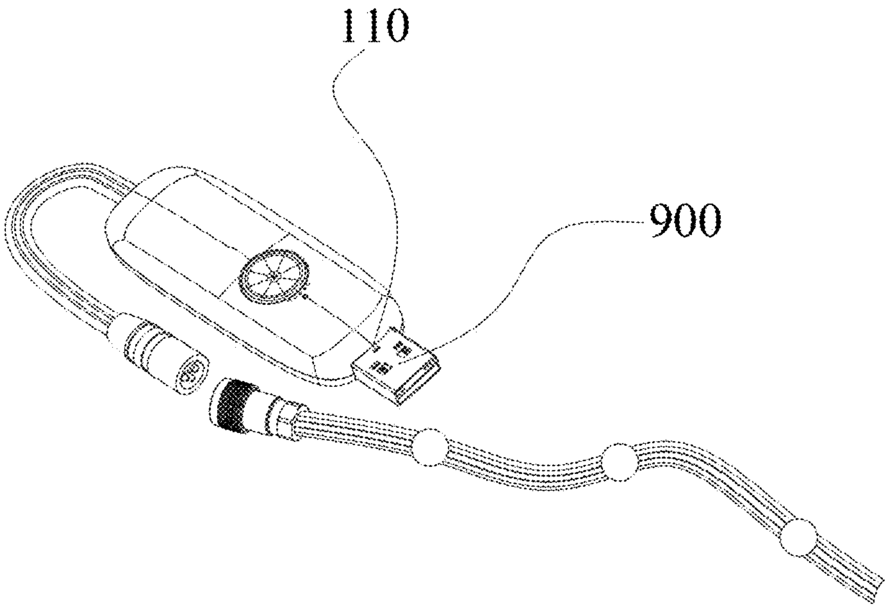
FIG. 8 is a schematic structural diagram according to Embodiment 4 of the present invention.

Referring to any one of the foregoing embodiments, as shown in FIG. 8, this embodiment discloses a control terminal assembly fitting with the LED light string for use. The control terminal 102 is mounted in a USB controller 110 and connected to a power supply terminal 101 via the three-wire conductor 300. The USB controller 110 is provided with a power interface 900, which is typically a USB interface, such that it, as the existing USB power interface, is connected for use, thus achieving power supply.

Embodiment 5

Figure 9:
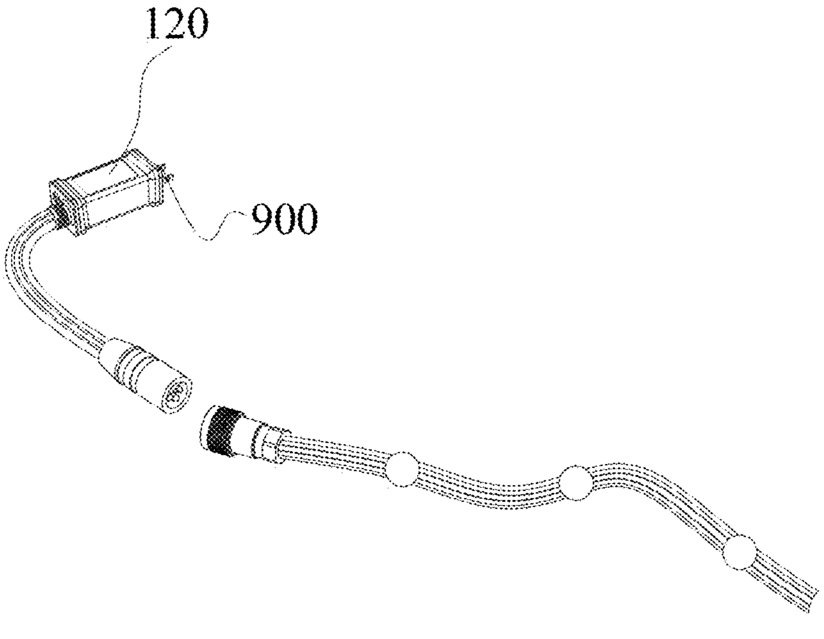
FIG. 9 is a first schematic structural diagram according to Embodiment 5 of the present invention.

Referring to any one of the foregoing embodiments, as shown in FIG. 9, this embodiment discloses a control terminal assembly fitting with the LED light string for use. The control terminal 102 is mounted in a voltage controller 120 and connected to a power supply terminal 101 via the three-wire conductor 300. The voltage controller 120 is provided with a power interface 900. The power interface 900, conforming to safety standards and corresponding specifications of different countries, may be a two-prong plug or a three-prong plug, thus achieving power supply.

Figure 15:
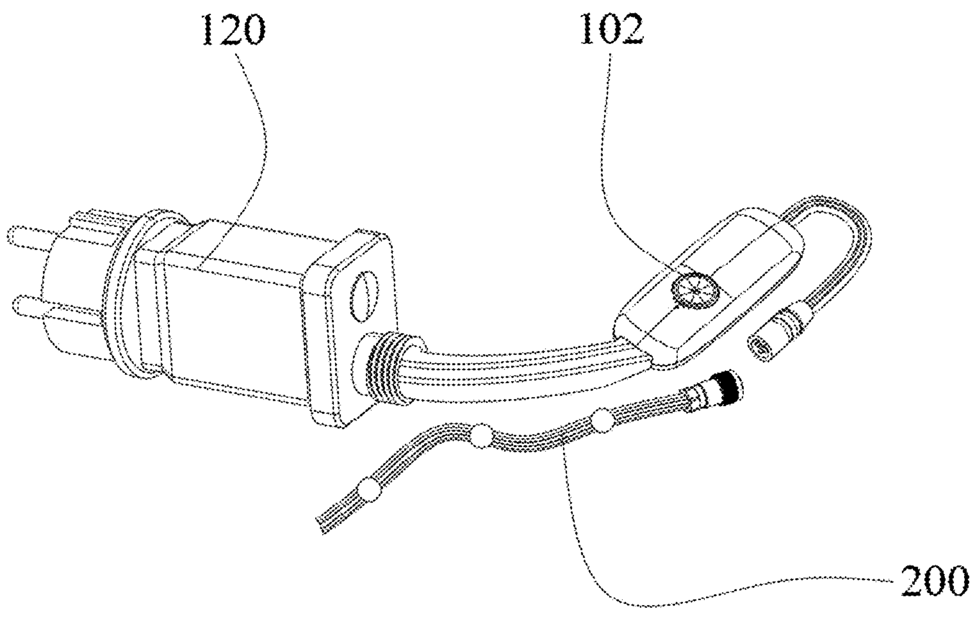
FIG. 15 is a second schematic structural diagram according to Embodiment 5 of the present invention.

Referring to any one of the foregoing embodiments, as shown in FIG. 15, the control terminal 102 is mounted outside the voltage controller 120 and connected to the power supply terminal 101 via the three-wire conductor 300. The voltage controller 120 is provided with a power interface 900. The power interface 900, conforming to safety standards and corresponding specifications of different countries, may be a two-prong plug or a three-prong plug, thus achieving power supply.

In the foregoing structure, the voltage controller 120 may be a conventional voltage controller or a water-proof controller, which is suitable for use indoor or outdoor.

Embodiment 6

Figure 10:
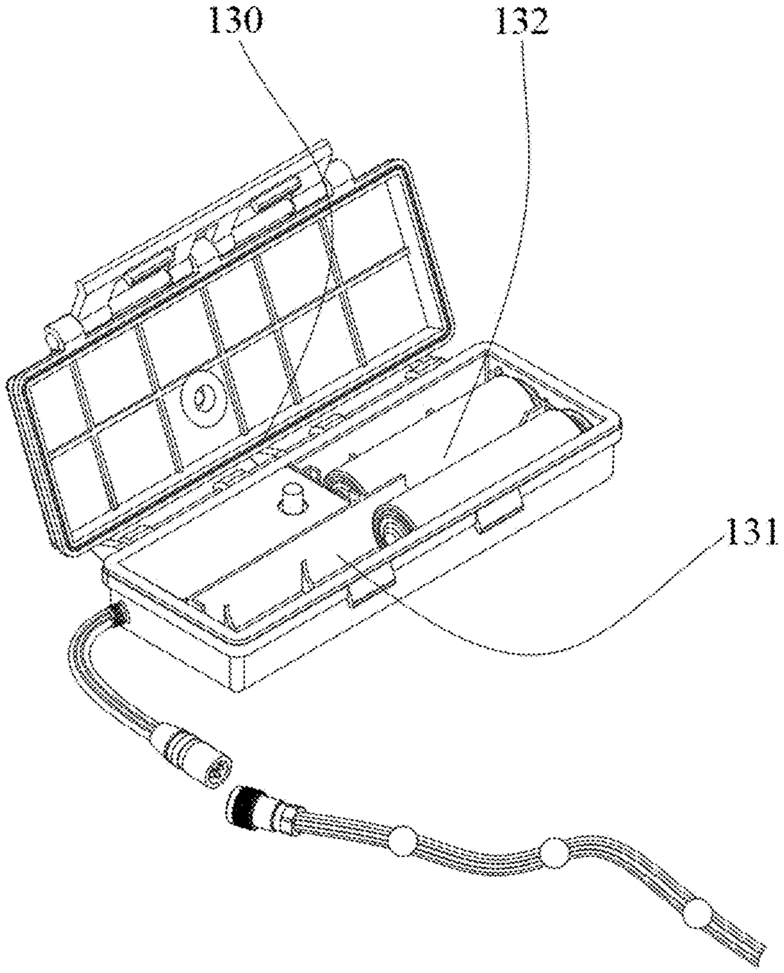
FIG. 10 is a first schematic structural diagram according to Embodiment 6 of the present invention.

Referring to any one of the foregoing embodiments, as shown in FIG. 10, this embodiment discloses a control terminal assembly fitting with the LED light string for use. The control terminal 102 is mounted in a battery box 130, the battery box 130 is provided with a battery slot 131, and the battery slot 131 is used for accommodating a detachable power source 132. Such structure facilitates outdoor and indoor use by the user who can deal with the detachable power source 132 in the internal cavity of the battery slot 131 in the battery box 130, thus achieving power supply.

Figure 11:
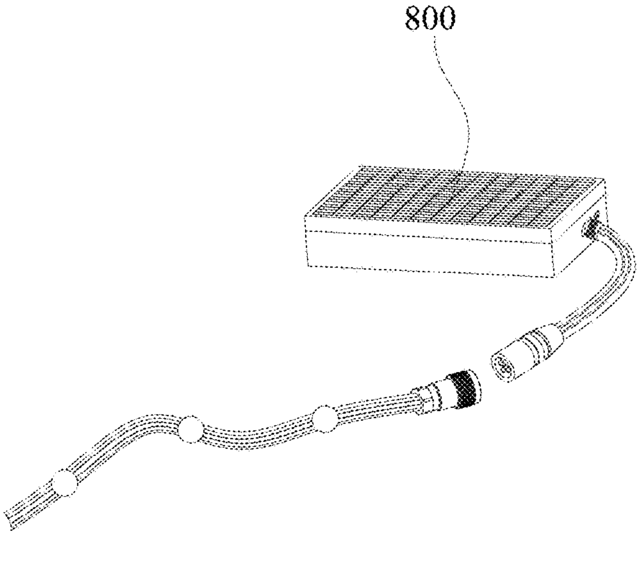
FIG. 11 is a second schematic structural diagram according to Embodiment 6 of the present invention.

In another preferred embodiment, as shown in FIG. 11, the battery box 130 is equipped with a solar assembly 800, and the solar assembly 800 may be insertable outward, so as to charge the battery in the battery box 130. Alternatively, a power supply may be built in for power collection, so as to supply power to the LED light body. The battery box 130 may be integrated with the solar assembly as a whole, thus facilitating power supply, where the solar assembly 800 is the commonly used component in the prior art.

Embodiment 7

Referring to any one of the foregoing embodiments, this embodiment discloses a decorative LED light set. When the first power connection terminal 201 is any one of the male plug or the female plug, the power supply terminal 101 is the other one, and the second power connection terminal 202 is able to be an enclosed end.

Figure 12:
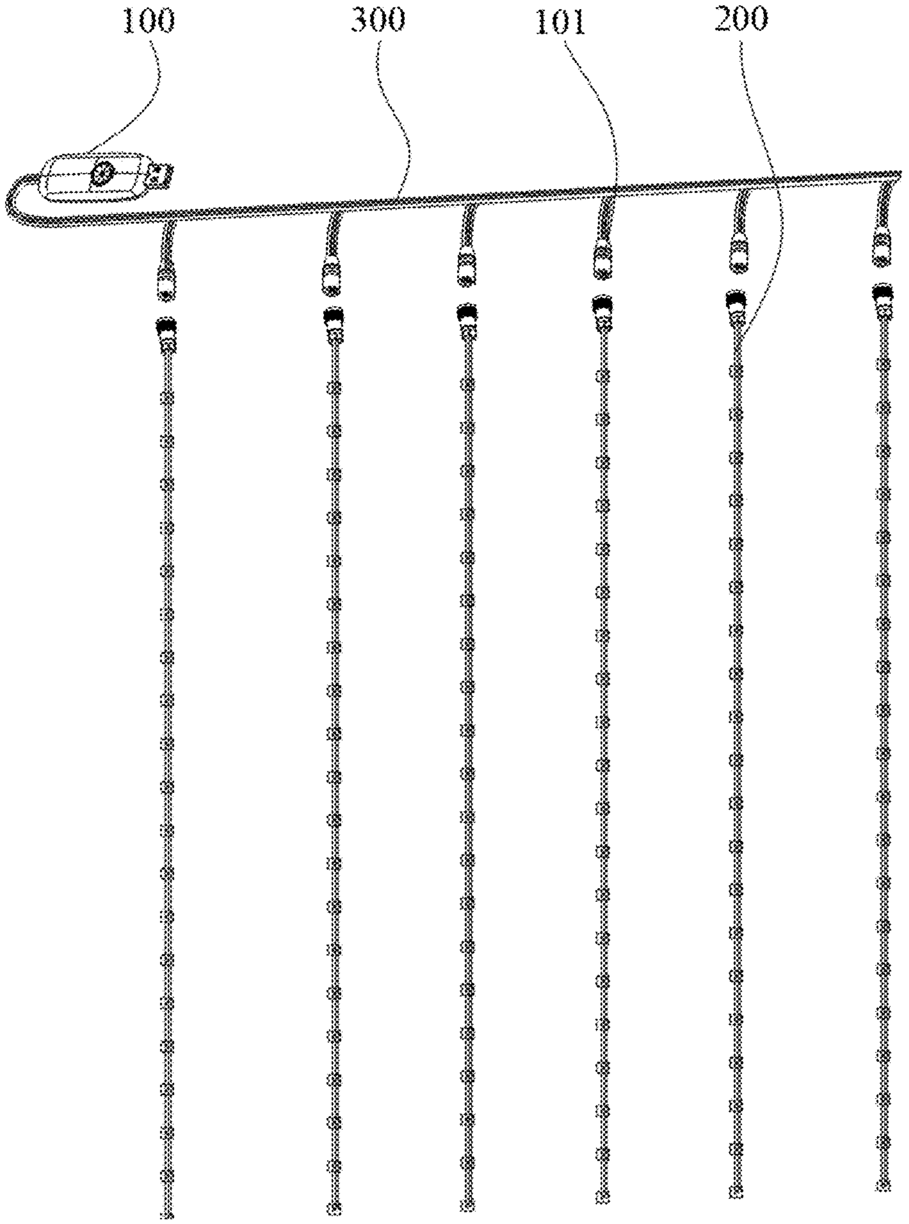
FIG. 12 is a first schematic structural diagram according to Embodiment 7 of the present invention.

In a preferred embodiment, as shown in FIG. 12, the decorative LED light set is a curtain light, which mainly includes a control terminal assembly 100. The control terminal assembly 100 is sequentially provided with multiple power supply terminals 101 via the three-wire conductor 300. In addition, the LED light string 200 is configured based on the quantity of light bodies of a single curtain, and its tail end is typically an enclosed end, that is, the second power connection terminal may be an enclosed end.

Figure 13:
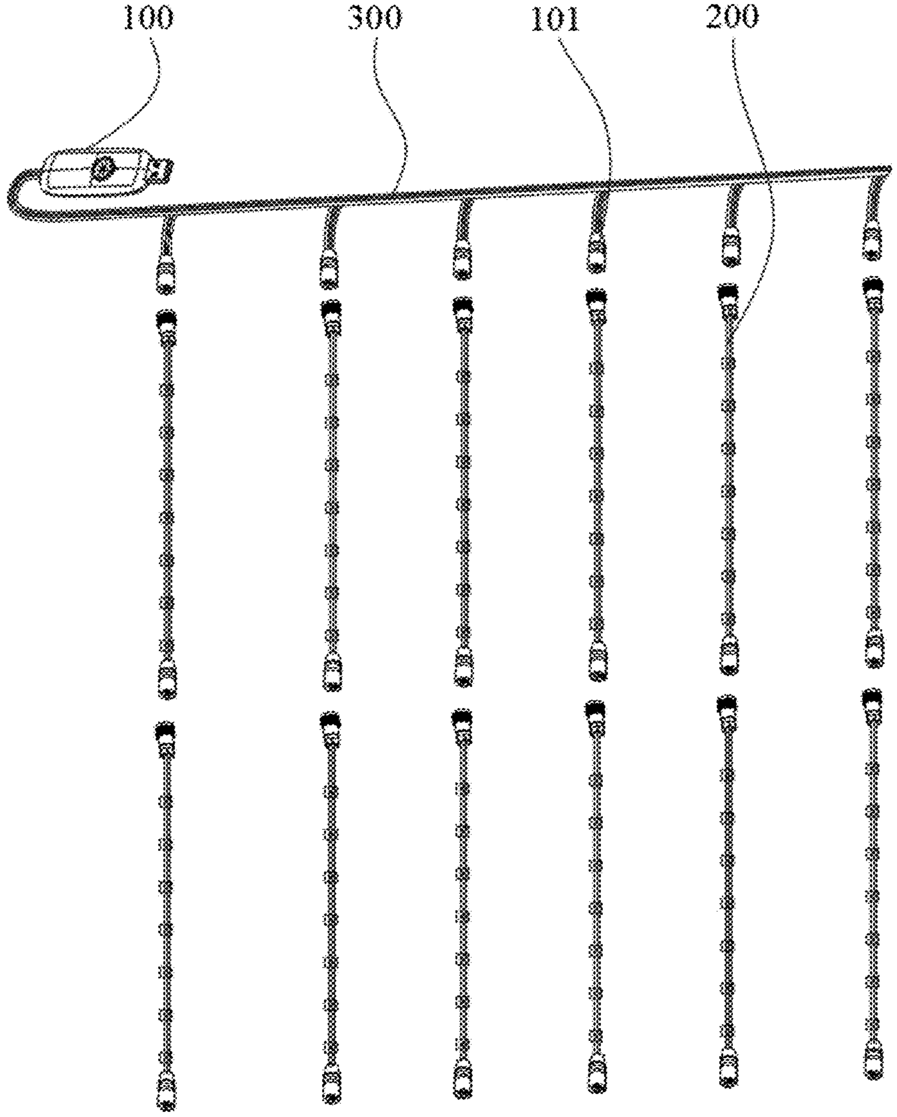
FIG. 13 is a second schematic structural diagram according to Embodiment 7 of the present invention.

In a preferred embodiment, as shown in FIG. 13, the foregoing LED light string 200 corresponding to the light bodies of a single curtain may be also of a continuous structure and is connected via the first power connection terminal and the second power connection terminal.

Figure 14:
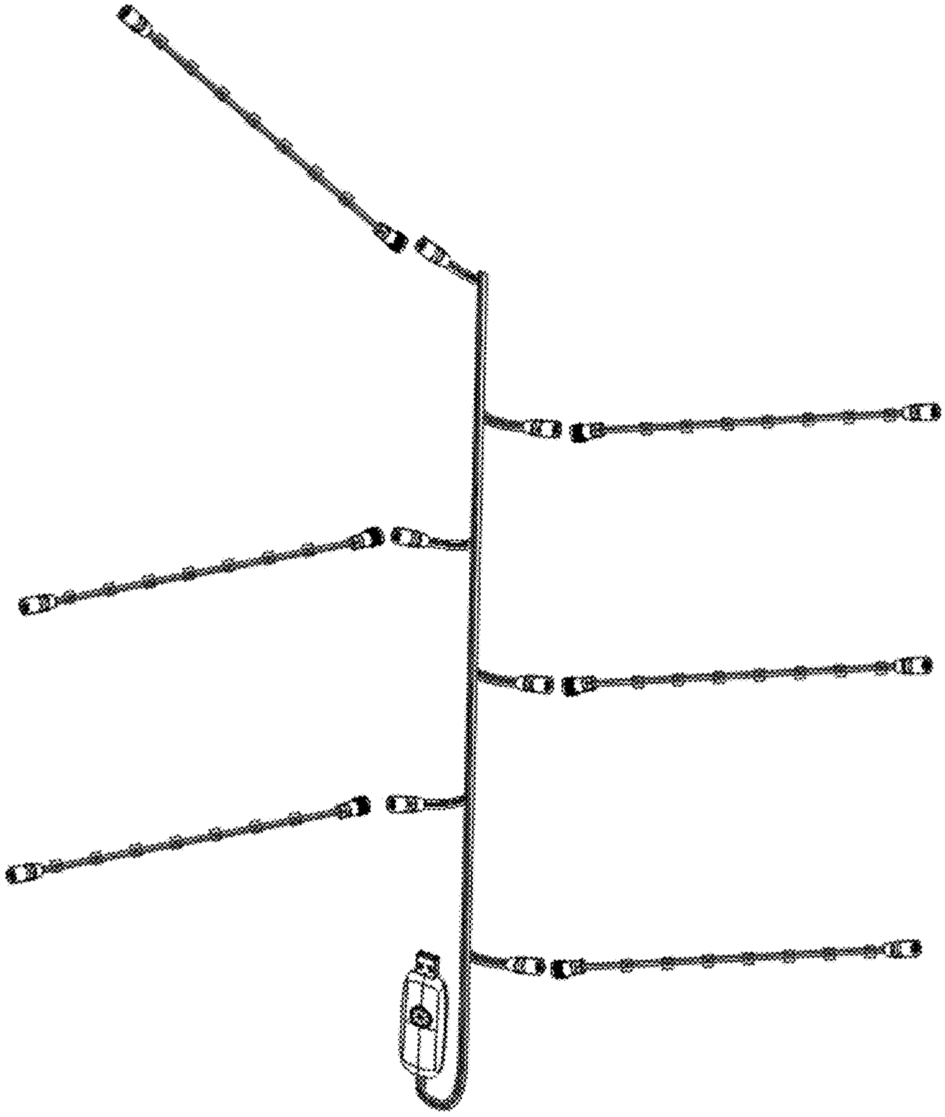
FIG. 14 is a third schematic structural diagram according to Embodiment 7 of the present invention.

In a preferred embodiment, the decorative LED light set may be in another type of, for example, a tree light set as shown in FIG. 14 or a net light set in the same type in other embodiments.

The above descriptions are merely the preferred embodiments of the present invention and do not limit the present invention in any form. Any simple modification, equivalent change, or modification made based on the technical principles of the present invention to the above embodiments still falls within the scope of the technical solution of the present invention.

What is claimed is:

1. A three-wire LED addressable online, comprising a three-wire conductor and a plurality of LED light bodies conductively connected via the three-wire conductor, wherein the three-wire conductor comprises a positive electrode conductor, a negative electrode conductor, and signal wires, wherein the signal wire in any one of the LED light bodies is disconnected, connection breakpoints of two signal wires in the LED light body are respectively a signal input terminal and a signal output terminal, a control chip and an LED light-emitting chip are disposed in the LED light body, and the signal input terminal and the signal output terminal are both connected to the control chip, wherein when each of the LED light bodies is operated in a signal transmission state, each of the LED light bodies is configured to perform internal signal retrieval, reading, shaping, amplification, and forwarding, and when each of the LED light bodies is operated in an address code burning state, each of the LED light bodies is configured to be in a locatable state to set an address code.

2. The three-wire LED addressable online according to claim 1, wherein the signal output terminal of any one of the LED light bodies is connected to the signal input terminal of a next LED light body correspondingly adjacent to the LED light body; and the control chip achieves instruction reception and transmission via the signal input terminal and the signal output terminal of the signal wire and completes addressing for a corresponding LED light body.

3. The three-wire LED addressable online according to claim 2, wherein the LED light body is provided with a first conductive bracket connected to the positive electrode conductor, a second conductive bracket connected to the negative electrode conductor, and a third conductive bracket set connected to the signal wire, wherein the third conductive bracket set comprises two third conductive brackets, the two third conductive brackets are apart from each other, the signal wire in an interval between the two third conductive brackets is disconnected, and two breakpoints of the signal wire are conductively connected to the two third conductive brackets, respectively.

4. The three-wire LED addressable online according to claim 3, wherein the LED light body comprises a light body bracket, the first conductive bracket, the second conductive bracket, and the third conductive bracket set are all disposed on a bottom surface of the light body bracket, a positive electrode bracket, a negative electrode bracket, and a signal bracket set are disposed on an upper surface of the light body bracket, the signal bracket set comprises two signal brackets, the positive electrode bracket is connected to the first conductive bracket, the negative electrode bracket is connected to the second conductive bracket, and the signal bracket and the third conductive bracket that are located on a same side are connected correspondingly.

5. The three-wire LED addressable online according to claim 4, wherein the control chip is disposed on the positive electrode bracket or the negative electrode bracket, and a signal conductor is disposed on the signal bracket to be conductively connected to the control chip; and a protection chip is also comprised, and the protection chip and the control chip are both disposed on the positive electrode bracket or the negative electrode bracket.

6. The three-wire LED addressable online according to claim 5, further comprising an encapsulating gel, wherein the encapsulating gel encapsulates an outer surface of the LED light body.

7. A three-wire continuous LED light string set, comprises a plurality of LED light strings, wherein the LED light string comprises a plurality of LED light bodies connected via a three-wire conductor, the LED light body being the three-wire LED addressable online according to claim 1, the LED light string further comprises a first power connection terminal at a head end and a second power connection terminal at a tail end, and any two of the LED light strings are connectable conductively via the first power connection terminal and the second power connection terminal; the LED light string further comprises a control terminal, the control terminal is connected to at least one power supply terminal, and the power supply terminal is conductively connected to the first power connection terminal or the second power connection terminal; and when the plurality of LED light strings are connected conductively and arbitrarily to form a whole combined LED light string, the control terminal is connected to the combined LED light string via the power supply terminal, and the control terminal is capable of coding and burning again for the combined LED light string.

8. The three-wire continuous LED light string set according to claim 7, wherein the first power connection terminal and the second power connection terminal are respectively a male plug and a female plug, and when one of the first power connection terminal and the second power connection terminal is the male plug, the other one is the female plug; and the power supply terminal is any one of a male plug or a female plug.

9. The three-wire continuous LED light string set according to claim 8, wherein when the first power connection terminal is any one of the male plug or the female plug, the power supply terminal is the other one, and the second power connection terminal is able to be an enclosed end.

10. The three-wire continuous LED light string set according to claim 9, wherein the control terminal comprises a control module and a boost module, wherein the control terminal is configured to achieve signal transmission and complete coding and burning output, and the control module is configured to achieve signal input for a control chip in each of the LED light bodies in the combined LED light string and complete addressing for each of the LED light bodies; and the boost module is configured to supply power to the control module during coding and burning.

11. The three-wire continuous LED light string set according to claim 10, wherein the control terminal is mounted in a USB controller or a voltage controller, the control terminal is connected to the power supply terminal via the three-wire conductors, and the USB controller or the voltage controller is provided with a power interface.

12. The three-wire continuous LED light string set according to claim 10, wherein the control terminal is mounted in a battery box, the battery box is provided with a battery slot, and the battery slot is used for accommodating a detachable power source.

13. The three-wire continuous LED light string set according to claim 12, wherein the battery box is provided with a solar assembly.

14. An online addressing method for a three-wire LED addressable online, applied to the three-wire LED addressable online according to claim 1 and specifically comprising the following steps:

S1: selecting a light string with a corresponding quantity of LED light bodies based on a use requirement, and connecting the light string to a control terminal;

S2: connecting the control terminal to a power supply, and turning on the power supply to electrify the entire LED light string;

S3: inputting, by the control terminal, an instruction signal via a button and entering an address burning mode via the control module, so as to achieve signal input for a control chip in each of the LED light bodies in the LED light string and complete coding and burning; and S4: achieving, by the control terminal, light control of the LED light string.

15. An online addressing method for a three-wire continuous LED light string set, applied to the three-wire continuous LED light string set according to claim 7, wherein the addressing method for the light string comprises the following steps:

S1: selecting a corresponding quantity of LED light strings based on a use requirement, sequentially connecting the light strings via the first power connection terminal and the second power connection terminal, and connecting the light strings to the control terminal;

S2: connecting the control terminal to a power supply, and turning on the power supply to electrify the entire combined LED light string;

S3: inputting, by the control terminal, an instruction signal via a button and entering an address burning mode via the control module, so as to achieve signal input for a control chip in each of the LED light bodies in the combined LED light string and complete coding and burning; and S4: achieving, by the control terminal, light control of the combined LED light string.

* * * * *